(12) United States Patent
Sohn et al.

(10) Patent No.: US 11,858,040 B2
(45) Date of Patent: Jan. 2, 2024

(54) METHOD OF INSPECTING PRINTING QUALITY OF 3D PRINTING OBJECT USING FEMTOSECOND LASER BEAM DURING 3D PRINTING PROCESS, AND APPARATUS AND 3D PRINTING SYSTEM FOR THE SAME

(71) Applicant: Korea Advanced Institute of Science and Technology, Daejeon (KR)

(72) Inventors: Hoon Sohn, Daejeon (KR); Peipei Liu, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 544 days.

(21) Appl. No.: 17/128,658

(22) Filed: Dec. 21, 2020

(65) Prior Publication Data

US 2021/0197279 A1    Jul. 1, 2021

(30) Foreign Application Priority Data

Dec. 31, 2019    (KR) .................. 10-2019-0179187

(51) Int. Cl.
*B22F 10/36* (2021.01)
*B33Y 10/00* (2015.01)
(Continued)

(52) U.S. Cl.
CPC .............. *B22F 10/36* (2021.01); *B22F 10/25* (2021.01); *B22F 12/43* (2021.01); *B33Y 10/00* (2014.12);
(Continued)

(58) Field of Classification Search
CPC .......... B22F 10/36; B22F 10/25; B22F 12/43; B22F 2998/00; B22F 10/00; B22F 10/10;
(Continued)

(56) References Cited

U.S. PATENT DOCUMENTS

2016/0185048 A1    6/2016    Dave et al.
2017/0341183 A1*   11/2017   Buller .................. B22F 10/36

FOREIGN PATENT DOCUMENTS

| JP | 2008-544269 A | 12/2008 |
|----|---------------|---------|
| JP | 4991708 B2    | 8/2012  |
| JP | 2016-060063 A | 4/2016  |

OTHER PUBLICATIONS

Chinese Office Action (with English Reporting Letter dated Dec. 7, 2022) dated Nov. 3, 2022 for Chinese Application No. 202011608788.6; 23 Pages.

* cited by examiner

*Primary Examiner* — Md M Rahman
(74) *Attorney, Agent, or Firm* — DALY, CROWLEY, MOFFORD & DURKEE, LLP

(57) ABSTRACT

Disclosed are a method of inspecting a printing quality of a 3D printing object using a femtosecond laser beam during a 3D printing process, and an apparatus and a 3D printing system for the same. A laser beam is irradiated from a femtosecond laser source disposed coaxially with a 3D printing laser source to inspect a state of the printing object. The laser beam generated by the femtosecond laser source is separated into a pump laser beam and a probe laser beam. The printing laser beam irradiated from a 3D printing laser source or the pump laser beam is irradiated onto a printing object to generate ultrasonic waves. To measure the ultrasonic waves, a probe laser beam is irradiated onto the printing object. The probe laser beam reflected by the printing object is detected. The quality of the printing object is inspected by analyzing the reflected probe laser beam.

19 Claims, 8 Drawing Sheets

(51) Int. Cl.
   *B33Y 30/00* (2015.01)
   *B33Y 50/02* (2015.01)
   *B22F 12/43* (2021.01)
   *B22F 10/25* (2021.01)
   *G01B 17/02* (2006.01)
   *G01N 29/04* (2006.01)
   *G01N 29/24* (2006.01)
   *G01N 29/44* (2006.01)
   *G01N 21/17* (2006.01)
   *G01N 29/07* (2006.01)

(52) U.S. Cl.
   CPC ............... *B33Y 30/00* (2014.12); *B33Y 50/02* (2014.12); *G01B 17/02* (2013.01); *G01N 21/1702* (2013.01); *G01N 29/043* (2013.01); *G01N 29/07* (2013.01); *G01N 29/2418* (2013.01); *G01N 29/44* (2013.01); *G01N 2021/1706* (2013.01); *G01N 2291/011* (2013.01); *G01N 2291/0231* (2013.01); *G01N 2291/0289* (2013.01); *G01N 2291/02827* (2013.01); *G01N 2291/02854* (2013.01)

(58) Field of Classification Search
   CPC ......... B33Y 10/00; B33Y 30/00; B33Y 50/02; B33Y 40/00; G01B 17/02; G01B 11/0666; G01N 21/1702; G01N 29/043; G01N 29/07; G01N 29/2418; G01N 29/44; G01N 2021/1706; G01N 2291/011; G01N 2291/0231; G01N 2291/02827; G01N 2291/02854; G01N 2291/0289; G01N 29/11; G01N 2291/02491; G01N 2291/0251; G01N 2291/044; G01N 2291/0258; G01N 2291/0427; G01N 29/04; B23K 26/0006; B23K 26/032; B23K 26/144; B23K 26/1476; B23K 26/342; B23K 31/125; Y02P 10/25
   USPC ........................................................ 356/318
   See application file for complete search history.

METHOD OF INSPECTING PRINTING QUALITY OF 3D PRINTING OBJECT USING FEMTOSECOND LASER BEAM DURING 3D PRINTING PROCESS, AND APPARATUS AND 3D PRINTING SYSTEM FOR THE SAME

CROSS-REFERENCE TO RELATED APPLICATION

This U.S. non-provisional application claims priority under 35 USC § 119 from Korean Patent Application No. 10-2019-0179187, filed on Dec. 31, 2019 in the Korean Intellectual Property Office (KIPO), the disclosure of which is hereby incorporated by reference in its entirety.

BACKGROUND

1. Technical Field

The present disclosure relates to a three-dimensional (3D) printing technology, and more particularly, to a method and an apparatus for inspecting a printing quality of a printing object using a femtosecond laser beam during a 3D printing, and a 3D printing system having the same.

2. Description of the Related Art

The 3D printing is known as a manufacturing technology for producing a 3D object. For the 3D printing of the 3D object, it is processed in a way that stacks layer by layer based on the 3D model data processing information. The 3D printing technology has advantages that facilitate realization of a complex shape, a shape formed inside a product, etc. Due to these advantages, the 3D printing technology is in the spotlight as a high value-added technology that makes it easy to manufacture various products such as various industrial parts and medical materials.

The 3D printing process can be performed by dividing the shape of a 3D product into a number of 2D cross sections having a uniform or variable thickness, and forming the 2D cross sections to be stacked one by one. There are several known 3D printing methods such as a material extrusion method, a material jetting method, a binder jetting method, a sheet lamination method, a vat photo-polymerization method, a powder bed fusion method, a directed energy deposition (DED) method, etc. Among them, the DED method is a method of applying laser energy to metal powder or wire material to be melted and fused, and is widely used because of its advantages that it can use inexpensive commercial materials compared to other methods, form a lamination on existing 3D shapes, and have superior mechanical properties compared to other methods.

In the 3D printing according to the DED method, a molten pool is formed when a laser beam irradiated from a laser source is irradiated to the substrate, and metal powder is supplied onto the molten pool to form a lamination.

A rough surface with a roughness of several micrometers or more inevitably occurs in 3D printing structures. In a build chamber where the 3D printing process is performed, a poor environment such as dust and/or vibration generated by movement may be created. The information related to the physical properties of the printed article formed by the 3D printing process and the presence of defects are important factors that determine the 3D printing quality. However, the measurement technology that can be applied to the 3D printing process is very limited. This is due to the roughness of the printing structure surface, the harsh environment inside the build chamber, and the limitations of data collection and processing speed. In particular, no technology has been developed for inspecting the printing quality by analyzing information obtained through measurement in real time during the 3D printing process.

SUMMARY

In order to solve the problems of the prior art as described above, embodiments of the present disclosure are to provide a method capable of measuring a printing state of a printing object with a high spatial measurement resolution using a femtosecond laser beam during the 3D printing process, and inspecting the printing quality of the printing object in real time.

In addition, embodiments of the present disclosure are to provide an apparatus for implementing the method and a 3D printing system having the same.

In one aspect, some embodiments of the present disclosure provide a method of inspecting a printing quality of a 3D printing object. The inspection method includes performing a 3D printing process by irradiating a printing laser beam generated by a 3D printing laser source onto a base material supplied to the printing object; generating a femtosecond laser beam by a femtosecond laser source to perform estimation of physical property of the printing object and detection of defects of the printing object in real-time while the 3D printing process is being performed; separating the femtosecond laser beam generated from the femtosecond laser source into a pump laser beam and a probe laser beam; generating an ultrasonic wave by exciting the printing object by the printing laser beam irradiated from the 3D printing laser source or by irradiating the separated pump laser beam onto the printing object; irradiating the probe laser beam onto a solidified region of the printing object to measure the ultrasonic wave; detecting the probe laser beam reflected by the printing object to be converted into an electric signal; and inspecting the printing quality of the printing object, including estimating a physical property of the printing object and detecting a defect of the printing object, by analyzing an amplitude and a phase of the converted electrical signal. In the inspection method, the printing laser beam, and the pump laser and the probe laser beam separated from the femtosecond laser beam are aligned coaxially with each other and applied to the printing object. In addition, the printing quality of the 3D printing object is inspected in real time using the femtosecond laser beam during the 3D printing process.

In an embodiment, in the generating the ultrasonic wave, the pump laser beam may be irradiated onto the solidified region of the printing object spaced apart from the printing laser beam by a predetermined distance to generate ultrasonic wave.

In an embodiment, the probe laser beam and the pump laser beam may be irradiated onto a same spot of the printing object.

In an embodiment, the printing laser beam, the pump laser beam, and the femtosecond laser beam may be coaxially formed.

In an embodiment, the physical property of the printing object may be estimated using a time difference between a first output signal caused by a surface reflected wave St of the printing object and a second output signal caused by a bottom reflected wave Sr of the printing object.

In an embodiment, the physical property may include at least one of a printing thickness and an elastic modulus of the printing object.

In an embodiment, the physical property of the printing object may be estimated by detecting a change in a propagation speed of the ultrasonic wave generated in the printing object.

In an embodiment, the detecting of the change in the propagation speed of the ultrasonic wave generated in the printing object may be performed by analyzing a phase difference of an output signal caused by the ultrasonic wave.

In an embodiment, the physical property estimated by detecting a change in the propagation speed of the ultrasonic wave may include an elastic modulus and/or a residual stress.

In an embodiment, detecting the change in the propagation speed of the ultrasonic wave generated in the printing object may be performed by detecting a change in an arrival time of a symmetric mode and an asymmetric mode of the ultrasonic wave.

In an embodiment, the detecting of the defect of the printing object may be performed by detecting at least one of a crack of the printing object and a void inside the printing object.

In an embodiment, the detecting of the defect of the printing object may be performed by detecting an output signal caused by an additional reflected wave Sr' generated by at least one of a crack and a void in the printing object.

In an embodiment, the probe laser beam irradiated onto the solidified region may be delayed in time compared to the pump laser beam through adjustment of an optical path length, and the pump laser beam irradiated onto the solidified region may be a signal modulated at a predetermined frequency.

In an embodiment, in the generating of the ultrasonic wave, the pump laser beam may be irradiated onto a same spot as the printing laser beam to generate the ultrasonic wave.

In an embodiment, in the generating of the ultrasonic wave, the printing laser beam may be used as the pump laser beam to generate the ultrasonic wave.

In an embodiment, the separating of the femtosecond laser beam may include: separating the femtosecond laser beam into first and second femtosecond laser beams using the first beam splitter; modulating the separated first femtosecond laser beam into the pump laser beam; generating the probe laser beam by adjusting an optical path length of the separated second femtosecond laser beam; and adjusting an optical path of the pump laser beam so that the pump laser beam is coaxial with the probe laser beam and the printing laser beam.

In an embodiment, the detecting of the defect of the printing object may be performed by detecting nonlinearity of an output signal caused by the ultrasonic wave.

In an embodiment, the detecting of the nonlinearity of the output signal caused by the ultrasonic wave may be performed by detecting a nonlinear modulation signal generated when the printing object is simultaneously excited by low-frequency and high-frequency ultrasonic waves.

In an embodiment, a defect detected based on the nonlinearity of the output signal caused by the ultrasonic wave may be a surface crack of the printing object.

In other aspect, some embodiments of the present disclosure provide an apparatus for inspecting a printing quality of a printing object using a femtosecond laser beam during a 3D printing process. The apparatus includes a 3D printing laser source, a femtosecond laser source, a first beam splitter, an electric/acoustic optical modulator, a time delay unit, a first optical unit, a second optical unit, a photo detector, a lock-in amplifier, and a control unit. The 3D printing laser source is configured to perform the 3D printing process by generating a printing laser beam for 3D printing to be irradiated onto a base material. The femtosecond laser source is disposed coaxially with the 3D printing laser source and configured to generate the femtosecond laser beam. The first beam splitter is configured to separate the femtosecond laser beam generated by the femtosecond laser source into a first femtosecond laser beam and a second femtosecond laser beam. The electric/acoustic optical modulator is configured to modulate the first femtosecond laser beam separated by the first beam splitter into a pump laser beam for exciting the printing object. The time delay unit is configured to output a probe laser beam for inspecting the printing quality of the printing object by adjusting a length of an optical path of the first femtosecond laser beam separated by the first beam splitter to be delayed. The first optical unit is configured to adjust a traveling direction of the printing laser beam irradiated from the 3D printing laser source or the pump laser beam output from the electric/acoustic optical modulator so as to be irradiated onto the printing object. The second optical unit is configured to adjust a traveling direction of the probe laser beam output from the time delay unit to be irradiated onto a solidified region of the printing object in order to measure the ultrasonic wave generated in the printing object when the printing laser beam or the pump laser beam is applied to the printing object. The photo detector is configured to detect the probe laser beam reflected by the printing object and convert the detected probe laser beam into an electric signal. The lock-in amplifier is configured to detect an amplitude and a phase of an output signal of the photo detector. The control unit is configured to perform a printing quality inspection of the printing object in real time, including estimating a physical property of the printing object and detecting a defect by analyzing the detected amplitude and phase. The printing laser beam, the pump laser and the probe laser beam separated from the femtosecond laser beam are aligned coaxially with each other and applied to the printing object.

In further other aspect, some embodiments of the present disclosure provide a 3D printing system which includes a 3D printing laser source, a base material supply source, a femtosecond laser source, a first beam splitter, an electric/acoustic optical modulator, a time delay unit, a first optical unit, a second optical unit, a photo detector, a lock-in amplifier, and a control unit. The 3D printing laser source is configured to irradiate a 3D printing laser beam onto a base material supplied to a 3D printing object to melt the base material so that a molten pool is formed on the printing object. The base material supply source is configured to supply the base material to the printing object. The femtosecond laser source disposed coaxially with the 3D printing laser source and configured to generate the femtosecond laser beam. The first beam splitter is configured to separate the femtosecond laser beam generated by the femtosecond laser source into a first femtosecond laser beam and a second femtosecond laser beam. The electric/acoustic optical modulator is configured to modulate the first femtosecond laser beam separated by the first beam splitter into a pump laser beam for exciting the printing object. The time delay unit is configured to output a probe laser beam for inspecting the printing quality of the printing object by adjusting a length of an optical path of the first femtosecond laser beam separated by the first beam splitter to be delayed. The first optical unit is configured to adjust a traveling direction of the printing laser beam irradiated from the 3D printing laser source or the pump laser beam output from the electric/ acoustic optical modulator so as to be irradiated onto the printing object. The second optical unit is configured to adjust a traveling direction of the probe laser beam output from the time delay unit to be irradiated onto a solidified region of the printing object in order to measure the ultrasonic wave generated in the printing object when the printing laser beam or the pump laser beam is applied to the printing object. The photo detector is configured to detect the probe laser beam reflected by the printing object and convert the detected probe laser beam into an electric signal. The lock-in amplifier is configured to detect an amplitude and a phase of an output signal of the photo detector. The control unit is configured to perform a printing quality inspection of the printing object in real time, including estimating a physical property of the printing object and detecting a defect by analyzing the detected amplitude and phase. The printing laser beam, the pump laser and the probe laser beam separated from the femtosecond laser beam are aligned coaxially with each other and applied to the printing object.

The 3D printing system according to the embodiments of the present disclosure may perform ultrasonic measurement for inspecting the printing quality of a printing object using a femtosecond laser. Since this ultrasonic measurement can be performed in real time with high spatial measurement resolution, the control precision and printing quality of the 3D printing process can be improved.

In addition, according to the present disclosure, signal measurement for a printing object using a femtosecond laser and analysis of the measured signal can be performed online in real time. That is, printing quality inspection, such as detection of defects of a 3D printing object and estimation of physical properties, can be performed in real time during the 3D printing process, and thus early detection and disposal of printing objects with defects is possible. It also enables real-time feedback control to improve the quality of printed products. Accordingly, it is possible to reduce production costs, improve product quality, and efficiency of the 3D printing process.

However, the effects of the present disclosure are not limited to the above effects, and may be variously extended without departing from the spirit and scope of the present disclosure.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
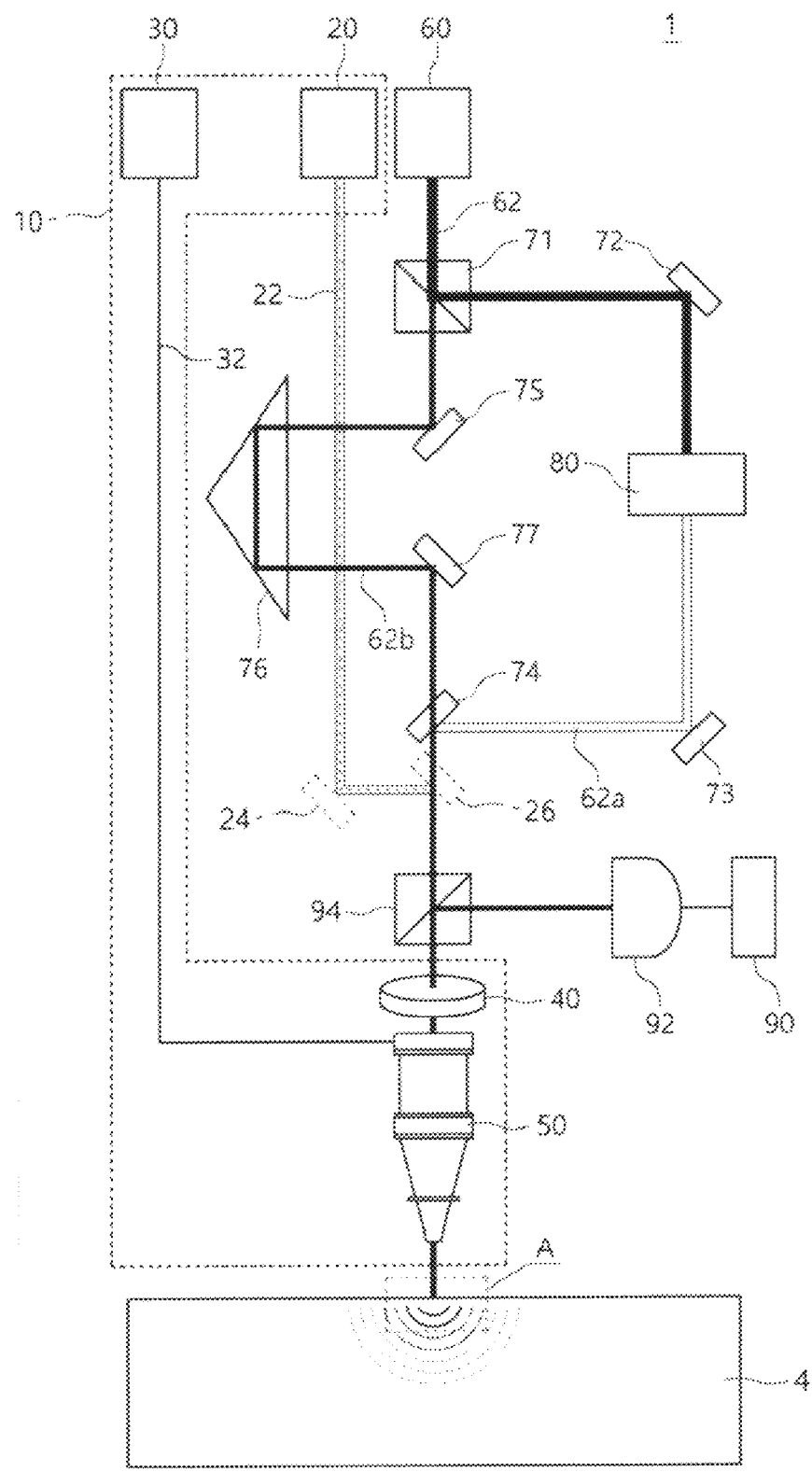
FIG. 1 is a configuration diagram of a 3D printing system according to an example embodiment of the present disclosure.

Hereinafter, embodiments of the present disclosure will be described in detail with reference to the accompanying drawings. The present disclosure may be implemented in various different forms, and is not limited to the embodiments described herein. In the drawings, parts irrelevant to the description are omitted in order to clearly describe the present disclosure, and the same reference numerals are assigned to the same or similar elements throughout the specification.

Figure 2:
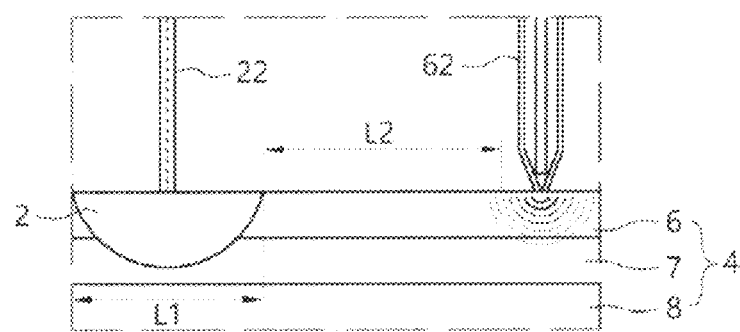
FIG. 2 is an enlarged view of part A shown in FIG. 1.

FIG. 1 illustrates a configuration of the 3D printing system according to an example embodiment of the present disclosure, and FIG. 2 is an enlarged view of part A in FIG. 1.

A 3D printing system 1 according to an example embodiment of the present disclosure may be a system for forming a 3D object by melting a base material using a laser. The 3D printing system 1 may include an apparatus for inspecting the printing quality of an object to be 3D printed, that is, a 3D printing object 4 using, a femtosecond laser beam having a high spatial measurement resolution during a 3D printing process.

Referring to FIG. 1, the 3D printing system 1 may include a laser source 20, a base material source 30, a focus lens 40, a nozzle 50, a femtosecond laser source 60, a first beam splitter 71, a time delay unit 76, an electric/acoustic optical modulator 80, a second beam splitter 94, a photo detector 92, a lock-in amplifier 90, and a control unit 100.

Here, as an example, the 3D printing system 1 may be a DED type 3D printing system capable of forming a 3D object by melting metal powder with a laser. The laser source 20, the base material source 30, the focus lens 40, and the nozzle 50 may form a general DED type 3D printer 10. However, the 3D printer 10 that can be applied to the 3D printing system 1 according to an embodiment of the present disclosure is not limited to the DED type. Any 3D printer capable of forming a molten pool of metal can be applied as a part to the 3D printing system 1 according to the present disclosure.

In addition, the 3D printing system 1 may include the femtosecond laser source 60 provided coaxially with the DED type 3D printer 10. That is, the femtosecond laser source 60 may be disposed coaxially with the laser source 20. Here, the coaxial disposition means that related components are arranged so that a plurality of laser beams share the same optical path. For example, the coaxial disposition means that the optical path is shared by separating and transmitting the laser beam by a beam splitter, a dichroic mirror, or a filter. Accordingly, it is possible to continuously measure an ultrasonic wave with respect to the printing object 4 without controlling the positions of the laser source 20 and the femtosecond laser source 60.

In addition, the femtosecond laser source 60, the first beam splitter 71, the time delay unit 76, the electric/acoustic optical modulator 80, the photo detector 92, the amplifier 90, and the control unit 100 may form a measuring apparatus capable of inspecting the printing quality of the 3D printing object using a femtosecond laser beam during the 3D printing process according to an example embodiment. In this case, the apparatus for inspecting the 3D printing quality may include an optical means for forming an optical path.

Accordingly, the 3D printing system 1 may include the 3D printer 10 and the apparatus that inspects the printing quality of the printing object using the femtosecond laser beam during the 3D printing process.

The laser source 20 may generate a printing laser beam 22 onto the 3D printing object 4. The printing laser beam 22 irradiated from the laser source 20 may pass through the first and second reflection mirrors 24 and 26 and the focus lens 40 in turn and be irradiated onto the printing object 4. At this time, the laser beam 22 irradiated from the laser source 20 may pass through the nozzle 50 for supplying the base material while being irradiated to a molten pool 2. Here, the laser beam 22 of the laser source 20 may have a wavelength band of 1.07 μm or less.

In FIG. 1, the laser source 20 may be disposed spatially apart from the femtosecond laser source 60. Since the laser source 20 is not disposed in a straight line with the nozzle 50, optical means such as a first reflection mirror 24 and a second reflection mirror 26 may be provided in order for the laser source 20 and the femtosecond laser source 60 to be coaxially disposed.

The first reflection mirror 24 may reflect the printing laser beam 22 from the laser source 20 toward the femtosecond laser source 60. In addition, the second reflection mirror 26 may reflect the printing laser beam 22 reflected by the first reflection mirror 24 toward the printing object 4.

However, the optical means for forming the optical path of the printing laser beam 22 is not limited thereto, and may be changed according to the positions of the laser source 20 and the femtosecond laser source 60 or the optical path thereof.

The base material supplied from the base material source 30 may be supplied to the nozzle 50 in the form of, for example, metal powder or metal wire through a separate supply pipe 32. To supply the base material to the printing object 4, a base material movement path formed in the nozzle 50 may be in parallel to or obliquely to the path through which the printing laser beam 22 passes. The base material supplied to the printing object 4 may be melted by the laser beam from the laser source 20 to form the molten pool 2 on the printing object 4.

The femtosecond laser source 60 may generate a femtosecond laser beam 62 to inspect a state of the printing object 4. As an example, the femtosecond laser source 60 may generate the femtosecond laser beam 62 with a repetition frequency of 40 MHz. In this case, the femtosecond laser beam 62 may have a wavelength different from that of the printing laser beam 22. For example, the femtosecond laser beam 62 may have a wavelength band of 515 nm or less.

Here, the femtosecond laser beam 62 may be used for estimating physical properties of the printing object 4 and detecting defects of the printing object 4. Physical properties of the printing object 4 may include Young's modulus and residual stress. In addition, defects of the printing object 4 may include cracks, voids, and porosity. In this case, physical property estimation and defect detection may be performed based on a pulse-echo technique or a pitch-catch technique, as described later.

In addition, ultrasonic measurement with the femtosecond laser beam 62 may be performed using a pump-probe technique. To this end, the femtosecond laser beam 62 may be divided into a pump laser beam 62a and a probe laser beam 62b. In practice, the pump laser beam 62a may be defined as an output of the electric/acoustic optical modulator 80, and the probe laser beam 62b may be defined as an output of the time delay unit 76. In this case, the pump laser beam 62a may excite the printing object 4. The probe laser beam 62b may be used for ultrasonic measurement to inspect the state of the printing object 4 using a time delay of the probe laser beam 62b with the pump laser beam 62a.

Here, the pump laser beam 62a may generate ultrasonic waves at the level of THz at an excitation point. Through this, it is possible to inspect minute defects at the level of nm. For example, when the printing object 4 is a steel material, a wavelength of the elastic wave generated from the steel material may be 10 nm according to the following equation.

$$\lambda = \frac{v}{f} \approx \frac{5000\,\frac{m}{s}}{0.5\,\text{THz}} = 10\,\text{nm} \tag{1}$$

The first beam splitter 71 may be disposed on the path of the femtosecond laser beam 62 irradiated from the femtosecond laser source 60. The first beam splitter 71 may separate the femtosecond laser beam 62 generated by the femtosecond laser source 60 into a first femtosecond laser beam and a second femtosecond laser beam. The first femtosecond laser beam may be modulated into the pump laser beam 62a while passing through the electric/acoustic optical modulator 80. The second femtosecond laser beam may pass through the time delay unit 76 to be output as the probe laser beam 62b. In this case, the femtosecond laser beam 62 transmitted through the first beam splitter 71 may be the probe laser beam 62b, and the beam separated by the first beam splitter 71 may be the pump laser beam 62a.

However, the optical path configuration of the pump laser beam 62a and the probe laser beam 62b is not limited thereto, and may be configured in various ways. For example, the optical paths of the pump laser beam 62a and the probe laser beam 62b may be configured opposite to that of FIG. 1.

To configure the optical path of the pump laser beam 62a, a third reflection mirror 72, a fourth reflection mirror 73, and a fifth reflection mirror 74 may be provided. Here, the third reflection mirror 72 may be disposed between the first beam splitter 71 and the electric/acoustic optical modulator 80. In this case, the third reflection mirror 72 may reflect the femtosecond laser beam 62 separated by the first beam splitter 71 toward the electric/acoustic optical modulator 80.

The fourth reflection mirror 73 may be disposed between the electric/acoustic optical modulator 80 and the fifth reflection mirror 74. In this case, the fourth reflection mirror 73 may reflect the pump laser beam 62a output from the electric/acoustic optical modulator 80 toward the fifth reflection mirror 74.

The fifth reflection mirror 74 may be disposed between the fourth reflection mirror 73 and the second beam splitter 94. In this case, the fifth reflection mirror 74 may reflect the reflected pump laser beam 62a toward the second beam splitter 94 or the nozzle 50. In addition, the second reflection mirror 26 may allow the pump laser beam 62a to transmit itself.

Accordingly, the pump laser beam 62a and the probe laser bean 62b separated by the first beam splitter 71 may be coaxially arranged with the laser beam 22 for the 3D printing and applied to the printing object 4.

However, the optical means for forming the optical path of the pump laser beam 62a is not limited thereto, and may be changed according to the positions of the laser source 20 and the femtosecond laser source 60 or the optical path thereof.

The time delay unit 76 may delay the second femtosecond laser beam that has passed through the first beam splitter 71 to be output as the probe laser beam 62b. In this case, the time delay unit 76 may adjust the length of the optical path of the probe laser beam 62b. That is, the time delay unit 76 may include a plurality of reflection mirrors to adjust the length of the optical path.

Here, a high sample frequency may be obtained by controlling the time delay between the pump laser beam 62a and the probe laser beam 62b. For example, the minimum displacement of the optical path length may be 0.1 μm. This delay corresponds to a sample frequency of 3 PHz according to the following equation. As a result, it is possible to measure in real time with high resolution, and thus control precision and quality of the 3D printing process can be improved.

$$f_{s,max} = \frac{v_{light}}{\Delta d_{min}} \approx \frac{3 \times \frac{10^8 m}{s}}{0.1 \ \mu m} = 3 \ \text{PHz} \qquad (2)$$

The time delay unit 76 may delay the femtosecond laser beam 62 to form a substantial probe laser beam 62b. Here, the probe laser beam 62b may have the same wavelength as the femtosecond laser beam 62. As an example, the probe laser beam 62b may have a wavelength band of 515 nm or less.

In order to form an optical path of the probe laser beam 62b and to adjust the optical path length of the time delay unit 76, a sixth reflection mirror 75 and a seventh reflection mirror 77 may be provided. The sixth reflection mirror 75 may be disposed between the first beam splitter 71 and the time delay unit 76. In this case, the sixth reflection mirror 75 may reflect the femtosecond laser beam 62 through the first beam splitter 71 toward the time delay unit 76.

The seventh reflection mirror 77 may be disposed between the time delay unit 76 and the nozzle 50. In this case, the seventh reflection mirror 77 may reflect the probe laser beam 62b, which is the time-delayed femtosecond laser beam 62, output from the time delay unit 76 toward the second beam splitter 94 or the nozzle 50. In addition, each of the second reflection mirror 26 and the fifth reflection mirror 74 may allow the probe laser beam 62b to transmit itself.

Accordingly, the probe laser beam 62b separated by the first beam splitter 71 may be formed coaxially with the pump laser beam 62a and the printing laser beam 22.

However, the optical means for forming the optical path of the probe laser beam 62b is not limited thereto, and may be changed according to the positions of the laser source 20 and the femtosecond laser source 60 or the optical paths thereof.

The electric/acoustic optical modulator 80 may modulate the first femtosecond laser beam separated by the first beam splitter 71 into the pump laser beam 62a. Here, the electrical/acoustic optical modulator 80 may be an acousto-optic modulator (AOM) or an electro-optic modulator (EOM).

For example, the electric/acoustic optical modulator 80 may perform pulse picking of the femtosecond laser beam 62 from the femtosecond laser source 60 at a modulation frequency $f_0$.

The electro/acoustic optical modulator 80 may modulate the femtosecond laser beam 62 into a substantial pump laser beam 62a. Here, the pump laser beam 62a may have a wavelength different from that of the printing laser beam 22. For example, the pump laser beam 62a may have a wavelength band of 257 nm or less.

The second beam splitter 94 may be disposed on the coaxial path of the printing laser beam 22, the pump laser beam 62a, and the probe laser beam 62b. The second beam splitter 94 may allow the printing laser beam 22, the pump laser beam 62a, and the probe laser beam 62b to pass through the nozzle 50.

As shown in FIG. 2, the printing laser beam 22 and the femtosecond laser beam 62 may be separated by at least a certain distance L2 to be irradiated onto the printing object 4. Here, the femtosecond laser beam 62 may include the pump laser beam 62a and the probe laser beam 62b. Optionally, the femtosecond laser beam 62 may include only the probe laser beam 62b, as described later with reference to FIGS. 5 and 6.

At this time, the molten pool 2 may be formed on the printing object 4 to be printed by the laser beam 22 for printing. The molten pool 2 may be formed with a constant width L1 according to the energy of the printing laser beam 22. For example, the width L1 of the molten pool 2 may be about 500 μm.

In addition, the femtosecond laser beam 62 may be irradiated to the solidified area of the molten printing object 4 by the printing laser beam 22. That is, the distance L2 between the printing laser beam 22 and the femtosecond laser beam 62 may be a distance from the molten pool 2 formed by the printing laser beam 22 to the solidified area. For example, the distance L2 may be about 1.5 mm to 2.5 mm.

In this case, the printing object 4 may be formed as a three-dimensional object by stacking a plurality of layers. In FIG. 2 for describing this example embodiment, it is illustrated that the printing object 4 is formed of a first layer 6, a second layer 7 and a third layer 8, and the molten pool 2 is formed in the first layer 6 and the second layer 7.

The probe laser beam 62b may be incident on and then reflected from the printing object 4. The second beam splitter 94 may reflect the probe laser beam 62b reflected from the printing object 4 toward the photo detector 92 in order to inspect the state of the printing object 4.

The photo detector 92 may detect the probe laser beam 62b reflected by the printing object 4. That is, the photo detector 92 may convert the received probe laser beam 62b into an electric signal. As an example, the photo detector 92 may be a photodiode.

The lock-in amplifier 90 may detect an amplitude and a phase of the output signal from the photo detector 92. For this, the lock-in amplifier 90 may remove noises included in the output signal. Here, the detected amplitude and phase may be used for estimating the physical properties of the printing object 4 and detecting defects of the printing object 4.

Figure 7:
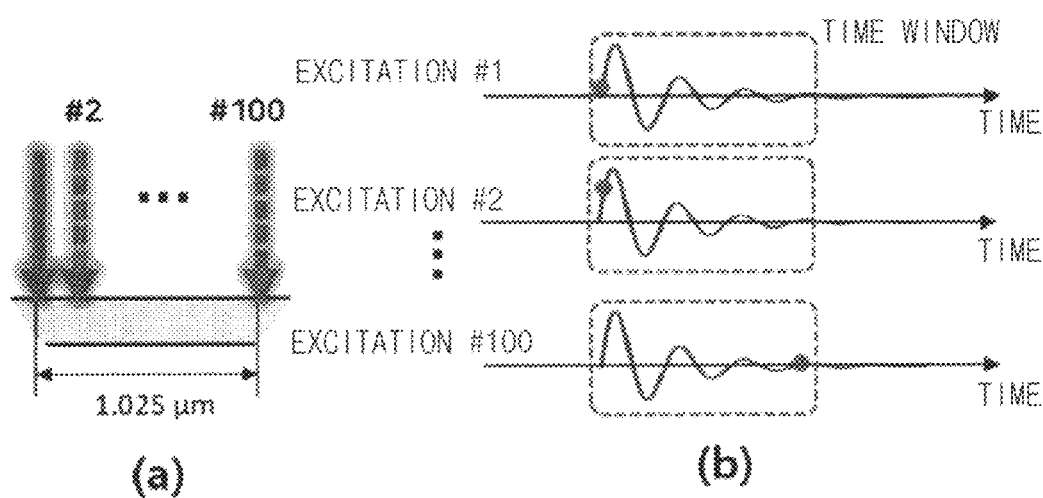
FIG. 7 is a view for describing the measurement of a moving printing object in the 3D printing system according to an example embodiment of the present disclosure.

FIG. 7 is a diagram for describing measurement of a moving printing object in the 3D printing system according to an embodiment of the present disclosure.

The pulse duration of the femtosecond laser beam 62 is very short. For example, when the maximum repetition rate of the femtosecond laser beam 62 is, for example, 40 MHz and the scan speed of the 3D printing system 1 is, for example, 10 mm/s, the pulse interval is 0.25 nm as shown in the following equation.

$$\frac{1}{40} \times 10^{-6} s \times \frac{10 \text{ mm}}{s} = 0.25 \text{ nm} \qquad (3)$$

Here, in the case of the piezoelectric-based delay line in the 3D printing system 1, the time taken to move to the next delay line position is approximately 1 μs.

The time required to measure, for example, 100 samples in the time window of the 3D printing system 1 is 102.5 μs as shown in the following equation.

$$\left(1 \ \mu s + 102.5 \frac{1}{40} \times 10^{-6} s\right) \times 100 = 102.5 \ \mu s \qquad (4)$$

Accordingly, the 3D printing system 1 may move 1.025 μm as shown in the following equation, while the femtosecond laser beam 62 moves during the measurement time required.

$$102.5 \mu s \times 100 \text{ mm}/s = 1.025 \mu s \qquad (5)$$

As shown in FIG. 7, under the assumption that the average physical properties and characteristic values are estimated in the 1.025 μm section, the measurement signal may be used to estimate physical properties such as the average elastic modulus of the target section and the thickness of the printing object 4.

Accordingly, the ultrasonic measurement using the femtosecond laser beam 62 can ignore the influence of movement of the printing object 4 compared to the conventional laser-based measurement techniques.

Figure 8:
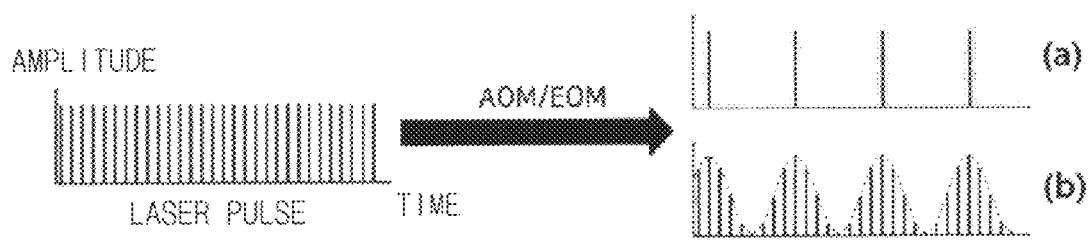
FIG. 8 is a diagram for describing modulation of the femtosecond laser beam in the 3D printing system according to an example embodiment of the present disclosure.
Figure 9:
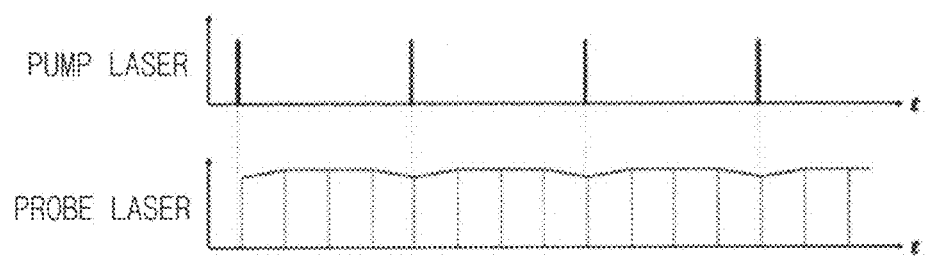
FIG. 9 is a diagram showing the pump laser beam and the probe laser beam shown in FIG. 7.

FIG. 8 is a diagram for describing modulation of the femtosecond laser beam in the 3D printing system according to an embodiment of the present disclosure, and FIG. 9 is a view showing the pump laser beam and the probe laser beam in FIG. 8.

In the case of using the femtosecond laser beam, the measured effective signal may be greatly influenced by environmental noises because the signal strength is relatively small. To minimize the influence due to the noises, an example embodiment of the present disclosure modulates the pump laser beam 62a by an acousto-optic modulator (AOM) or an electro-optic modulator (EOM), so that a signal can be transmitted at a predetermined frequency. At this time, the signal can be effectively measured by the lock-in amplifier 90.

As shown in FIG. 8, by the AOM or EOM, the laser pulse may be (a) pulse-peaked or (b) pulse-modulated. The pump laser beam 62a modulated in this way may allow useful ultrasonic information to be transmitted through a carrier frequency.

As shown in FIG. 9, the pump laser beam 62a may be pulse-peaked. Here, the pulse peaking rate may be the modulation frequency $f_0$. The probe laser beam 62b reflected by the printing object 4 may have a shorter pulse interval than the pump laser beam 62a.

Figure 10:
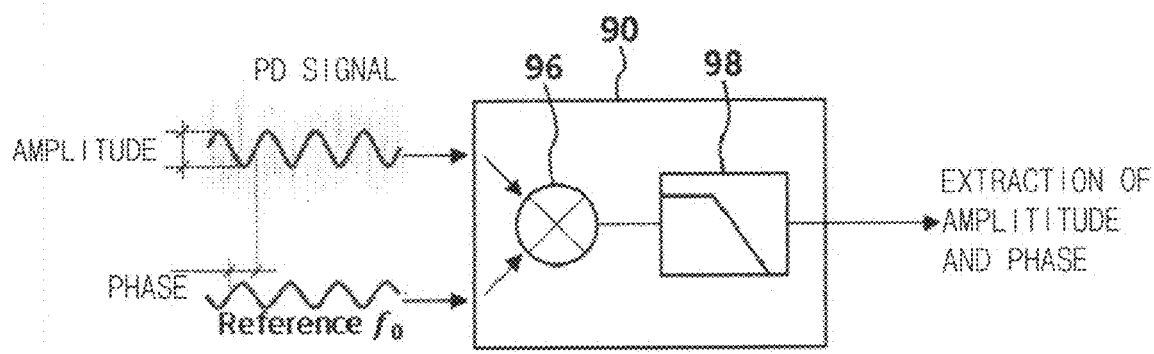
FIG. 10 illustrates a block diagram showing a detailed configuration of the lock-in amplifier shown FIG. 1.

FIG. 10 illustrates a detailed configuration of the lock-in amplifier shown in FIG. 1.

The lock-in amplifier 90 can demodulate amplitude and phase information from a response signal even in an environment of extreme noises. Referring to FIG. 10, the lock-in amplifier 90 may include a demodulator 96 and a low pass filter 98.

The lock-in amplifier 90 may receive an output signal (a PD signal) of the photo detector 92 as an input signal, and a reference signal of a modulation frequency $f_0$. The reference signal may have a phase difference from the PD signal corresponding to a time delay between the pump laser beam 62a and the probe laser beam 62b.

The demodulator 96 may demodulate the output signal (PD signal) of the photo detector 92 with the reference signal of $f_0$.

The low pass filter 98 may pass a low frequency band of a signal demodulated by the demodulator 96. The low pass filter 98 may remove noise in a high frequency band. Accordingly, the lock-in amplifier 90 may extract accurate amplitude and phase information of the detected signal.

The control unit 100 may analyze the amplitude and phase information of the output signal from the lock-in amplifier 90 to inspect the printing quality of the printing object 4. The printing quality inspection may be an inspection including physical property estimation and defect detection, and may be performed using a pulse-echo technique or a pitch-catch technique, as described later.

Hereinafter, a method of inspecting printing quality using the control unit 100 will be described.

In an example embodiment, inspecting the printing quality of the 3D printing object may include estimating physical properties of the printing object 4 and detecting defects such as cracks, voids, etc. in the printing object 4. In the table below, items for the printing quality inspection that may be performed by the 3D printing system 1 are briefly classified. However, the table below is only presented to aid understanding of the present disclosure, and the present disclosure should not be construed as being limited by the table presented below.

TABLE 1

| Item | Classification | | Description |
|---|---|---|---|
| Printing quality inspection | Estimation of physical property | Thickness of printing object | Use time difference between reflection waves from surface and floor |
| | | Modulus of elasticity | Detect change in ultrasonic propagation speed |
| | | Residual stress | Detect change in ultrasonic propagation speed |
| | | Etc. | |

TABLE 1-continued

| Item | Classification | Description |
|---|---|---|
| Detection of defect | Internal void Surface crack Etc. | Detect additional reflected wave Detect nonlinearity of output signal |

Figure 3:
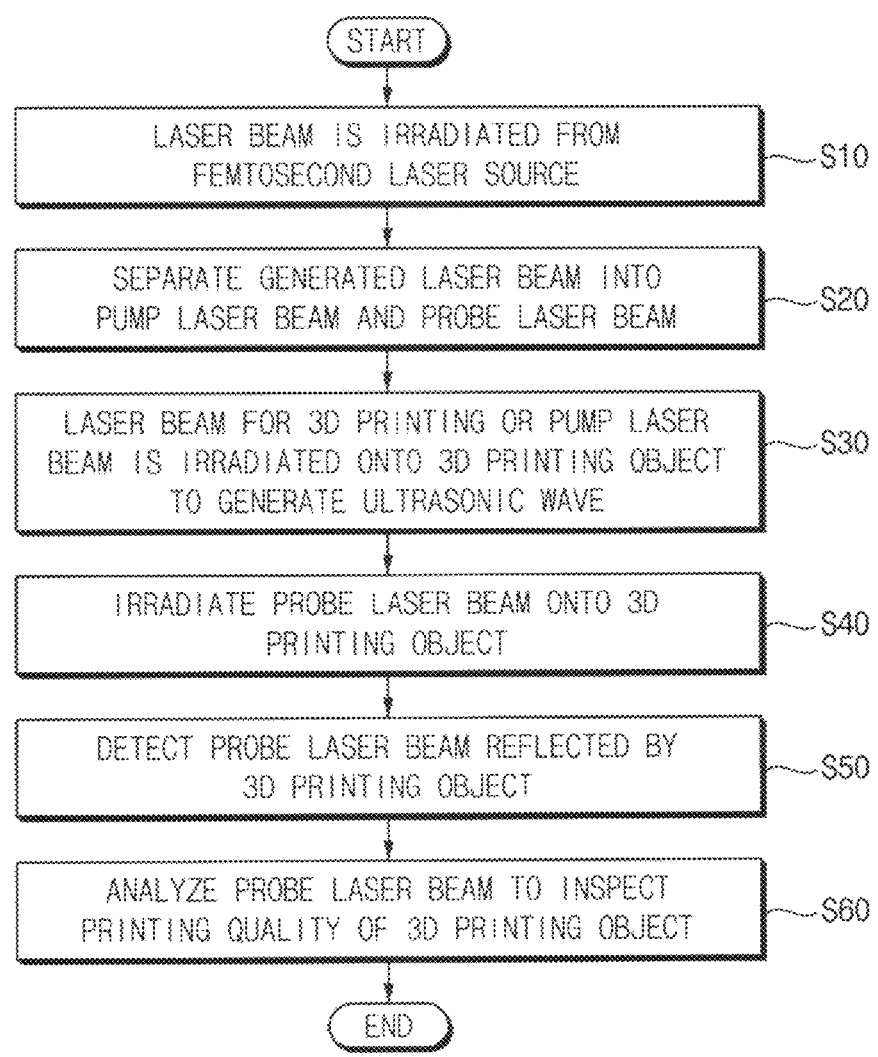
FIG. 3 is a flow chart of a method for inspecting the printing quality of a 3D printing object according to an embodiment of the present invention.

FIG. 3 is a flow chart of a method of inspecting the printing quality of the 3D printing object according to an embodiment of the present disclosure.

As shown in FIG. 3, the printing quality inspection method according to an embodiment of the present disclosure may be performed using the control unit 100 of the 3D printing system 1. The quality inspection method may include the steps of: irradiating a laser beam from a femtosecond laser source (S10), separating the generated laser beam into a pump laser beam and a probe laser beam (S20), generating ultrasonic waves by irradiating the laser beam for the 3D printing, that is, the printing laser beam or the pump laser beam to the printing object (S30), irradiating the probe laser beam to the printing object (S40), detecting the probe laser beam reflected by the printing object (S50), and analyzing the probe laser beam to inspect the printing quality of the printing object (S60).

In the 3D printing system 1 according to an example embodiment, firstly a femtosecond laser beam may be irradiated from the femtosecond laser source 60 disposed coaxially with the 3D printing laser source 30 (S10). The irradiated femtosecond laser beam 62 may be divided into the pump laser beam 62a and the probe laser beam 62b by the first beam splitter 71 (S20).

In an example embodiment, ultrasonic waves may be generated by exciting the printing object 4 using the pump laser beam 62a separated from the femtosecond laser beam 62. In another example embodiment, in addition to the pump laser beam 62a, the laser beam 22 for 3D printing may be irradiated onto the printing object 4 to generate ultrasonic waves (S30).

Next, the probe laser beam 62b separated from the femtosecond laser beam 62 is used to measure the ultrasonic waves generated on the printing object 4 by the pump laser beam 62a or the printing laser beam 22 (S40).

In this case, a pulse-echo method or a pitch-catch method may be used for the measurement of ultrasonic waves. That is, the pulse-echo method and the pitch-catch method may be selectively applied according to the positional relationship between the irradiation location of the laser beams 62a and 22 for ultrasonic excitation and the irradiation location of the probe laser beam 62b for ultrasonic measurement. The two methods do not have a superior or inferior relationship to each other, and can be appropriately selected according to the inspection object or inspection environment.

Hereinafter, the steps of generating ultrasonic waves for each method (S30), irradiating the probe laser beam 62b, detecting the probe laser beam 62b (S50), and analyzing the same (S60) will be described.

The table below is a table that summarizes the description to be described below, and that briefly classifies physical properties that can be estimated using the pulse-echo and pitch-catch methods among ultrasonic measurement methods and defects that can be detected. However, Table 2 below is also only presented to aid understanding of the present disclosure, and the present disclosure should not be construed as being limited by Table 2 presented below.

TABLE 2

| | Method | Classification | Description |
|---|---|---|---|
| Measurement of ultrasound wave | Pulse-echo technique | Thickness of printing object | Use time difference between reflection waves from surface and floor |
| | | Modulus of elasticity | 1. Use time difference between reflection waves from surface and floor 2. Detect change in ultrasonic propagation speed |
| | | Internal void Etc. | Detect additional reflected waves |
| | Pitch-catch technique | Modulus of elasticity | Detect change in ultrasonic propagation speed |
| | | Residual stress | Detect change in ultrasonic propagation speed |
| | | Surface crack Etc. | Detect nonlinearity of output signal |

In an example embodiment, the 3D printing system 1 may use a pulse-echo technique to inspect the printing quality of the printing object 4.

Figure 4:
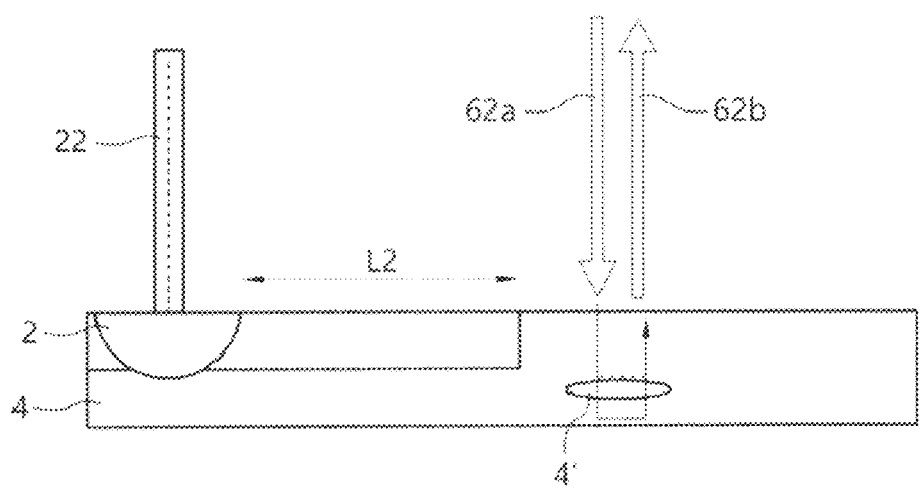
FIG. 4 is a diagram showing an example configuration of a printing laser beam and a femtosecond laser beam when a pulse-echo technique is used in the 3D printing system according to an example embodiment of the present disclosure.
Figure 11:
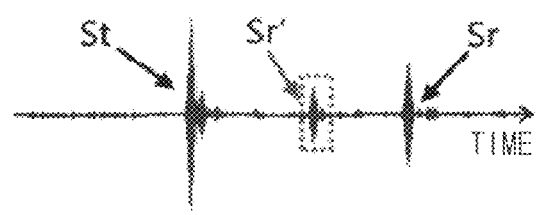
FIG. 11 is a diagram illustrating an analysis an output signal caused by a surface reflected wave St and a bottom reflected wave Sr of the printing object 4 as an example of pulse-echo signal analysis.

FIG. 4 illustrates an example configuration of the printing laser beam and the femtosecond laser beam when the pulse-echo technique is used in the 3D printing system 1. FIG. 11 illustrates an analysis an output signal due to a surface reflected wave St and a bottom reflected wave Sr of the printing object 4 as an example of pulse-echo signal analysis.

In more detail, referring to FIG. 4, the pump laser beam 62a and the probe laser beam 62b may be irradiated onto a region of the printing object 4 which is spaced apart from the printing laser beam 22 by a predetermined distance L2. That is, the pump laser beam 62a and the probe laser beam 62b may be irradiated onto the same spot of the printing object 4. In an example embodiment, the pump laser beam 62a and the probe laser beam 62b may be irradiated within a solidified region of the printing object 4.

In this case, the pump laser beam 62a may be for generating ultrasonic waves by exciting the printing object 4. The probe laser beam 62b may be for measuring ultrasonic waves to inspect the state of the printing object 4. That is, according to the pulse-echo technique, the printing object 4 may be ultrasonically excited by the femtosecond laser beam (pump laser beam 62a), and the ultrasonic wave generated in the printing object 4 by the excitation may be is measure using the femtosecond laser beam (probe laser beam 62b).

The probe laser beam 62b irradiated for the ultrasonic measurement may be reflected by the printing object 4 and then detected through the photo detector 92 (S50). At this time, referring to FIG. 11, the photodetector 92 may measure both an output signal caused by the surface reflected wave St of the printing object 4 and an output signal caused by the bottom reflected wave Sr of the printing object 4.

Next, in an example embodiment, the 3D printing system 1 may inspect the printing quality of the object 4 to be printed by analyzing the measured output signal (S60).

In the measured signals, there may occur a time difference between the output signal caused by the surface reflected wave St and the output single caused by the bottom reflected wave Sr. The control unit 100 may estimate physical properties such as a thickness and an elastic modulus of the printing object 4 by analyzing the time difference.

In an example embodiment, prior to estimating the above-described physical property of the printing object, an artificial neural network model may be first constructed for analyzing a correlation between the physical property and the time difference and estimating the physical property such as an elastic modulus, etc. of the printing object. To this end, data regarding the time difference between the output signals due to the surface reflected wave St and the bottom reflected wave Sr under the above-described physical property may be collected for machine-learning. In addition, the control unit 100 repeatedly learns the collected data using a machine-learning algorithm, thereby obtaining an artificial neural network model capable of analyzing the correlation between the physical property of the printing object 4 and the time difference of the output signals.

In addition, in an example embodiment, the control unit 100 may detect a change in the propagation speed of ultrasonic waves generated in the printing object 4 through the pulse-echo technique to estimate the physical property of the printing object.

In more detail, the propagation speed of ultrasonic waves in the printing object 4 may be affected by physical properties including elastic modulus, residual stress, etc. As a result, a phase difference occurs in the output signals obtained through the ultrasonic measurement according to the physical properties of the printing object 4.

The control unit 100 may analyze such a phase difference to find out the elastic modulus of the printing object 4. To this end, in an example embodiment, the control unit 100 may analyze a correlation between the elastic modulus and the phase difference. As an example, the control unit 100 may be configured to repeatedly learn a plurality of data to estimate an elastic modulus value according to a phase difference, and form an artificial neural network model based on the accumulated data.

In an example embodiment, the control unit 100 may detect a defect in the printing object 4 by detecting an output signal due to an additional reflected wave Sr' through the pulse-echo technique.

In more detail, when there is no defect in the printing object 4, the pump laser beam 62a irradiated to the printing object 4 may generate only the reflected wave St reflected by the surface of the printing object 4 and the reflected wave Sr reflected by the bottom surface of the printing object 4. However, as shown in FIG. 11, when a defect such as a void exists inside the printing object 4, the pump laser beam 62a irradiated to the printing object 4 may generate an additional reflected wave due to the void Sr'. In other words, when additional reflected waves Sr' other than the normal reflected waves St and Sr are detected, it can be estimated that there is an internal void of the printing object 4.

Meanwhile, in an example embodiment that utilizes high-speed measurement of the femtosecond laser beam, when measuring the probe laser beam 62b to measure ultrasonic waves in the printing object 4, the entire measurement may not be performed. That is, it may be possible to selectively measure a part of the reflected wave signal or only a part of the phase difference. Through this partial measurement, data measurement time can be drastically reduced. This enables real-time ultrasonic measurement during the 3D printing process.

In an example embodiment, the 3D printing system 1 may use the pitch-catch technique to inspect the printing quality of the printing object 4.

Figure 5:
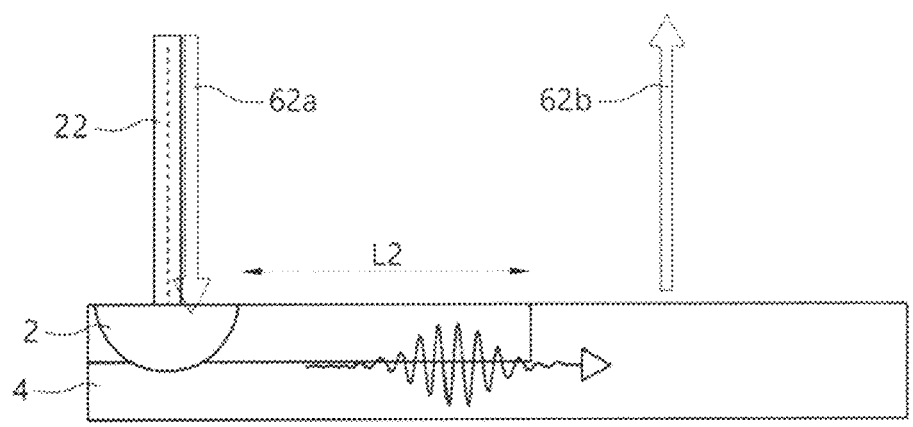
FIG. 5 is a diagram illustrating other example configuration of the printing laser beam and the femtosecond laser beam when a pitch-catch technique is used in the 3D printing system according to an example embodiment of the present disclosure.
Figure 6:
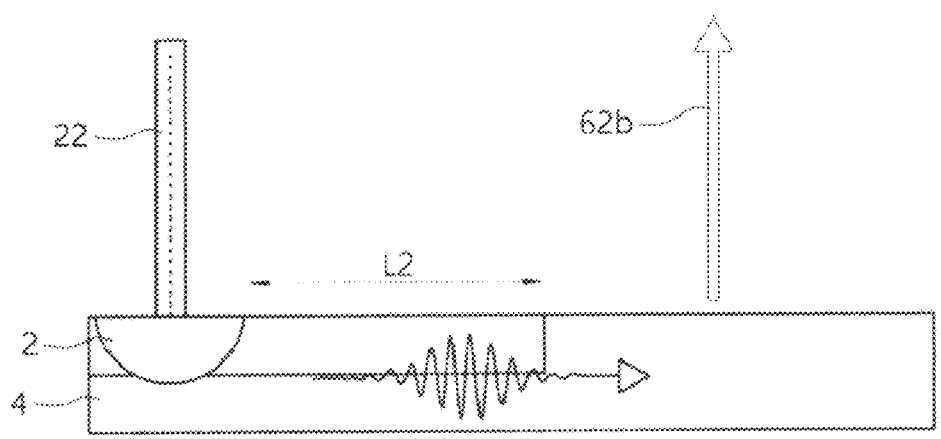
FIG. 6 is a diagram showing another example configuration of the printing laser beam and the femtosecond laser beam when the pitch-catch technique is used in the 3D printing system according to an example embodiment of the present disclosure.
Figure 12:
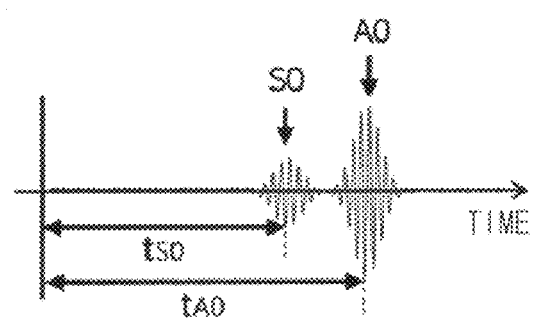
FIG. 12 illustrates, as an example of the pitch-catch technique signal analysis, an analysis of an output signal caused by a symmetric mode and an asymmetric mode of an ultrasonic wave.
Figure 13:
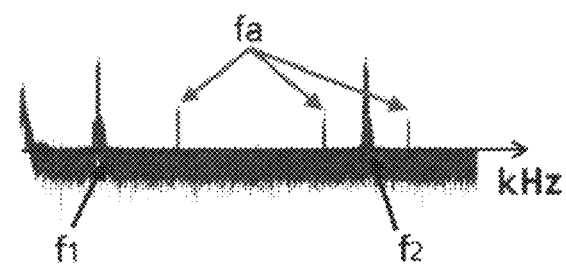
FIG. 13 illustrates, as an example of the pitch-catch technique signal analysis, an example of nonlinear modulation signal that is generated due to surface crack of the printing object when simultaneously applying low-frequency and high-frequency ultrasonic waves to the printing object for excitation.

FIG. 5 illustrates an example configuration of the printing laser beam and the femtosecond laser beam when the pitch-catch technique is used in the 3D printing system. FIG. 6 illustrates another example configuration of the printing laser beam and the femtosecond laser beam when the pitch-catch technique is used in the 3D printing system. FIG. 12 illustrates, as an example of the pitch-catch technique signal analysis, an analysis of an output signal according to a symmetric mode S0 and an asymmetric mode A0 of an ultrasonic wave. FIG. 13 illustrates, as an example of the pitch-catch technique signal analysis, an example of non-linear modulation ($f_a$) which is generated due to surface crack of the printing object when simultaneously applying low-frequency (f1) and high-frequency (f2) ultrasonic waves to the printing object for excitation.

In more detail, referring to FIG. 4, the pump laser beam 62a may be irradiated at the same spot as the printing laser beam 22. The probe laser beam 62b may be irradiated onto the printing object 4 at a spot spaced apart from the printing laser beam 22 or the pump laser beam 62a by a predetermined distance L2. As an example, the probe laser beam 62b may be irradiated onto the solidified region of the printing object 4.

Here, the pump laser beam 62a may be used to excite the printing object 4 to generate ultrasonic waves. The probe laser beam 62b may be for measuring ultrasonic waves to inspect the state of the printing object 4.

Referring to FIG. 6, as another example of the pitch-catch technique, the 3D printing system 1 may not use the pump laser beam 62a. That is, the printing object 4 may be excited using the printing laser beam 22 instead of the pump laser beam 62a to generate ultrasonic waves.

In this case, the probe laser beam 62b may be irradiated onto the printing object 4 by being spaced apart from the printing laser beam 22 by the predetermined distance L2. As an example, the probe laser beam 62b may be irradiated onto the solidified region of the printing object 4. Here, the probe laser beam 62b may be for measuring ultrasonic waves so that the state of the printing object 4 can be inspected.

Even in the pitch-catch technique, the probe laser beam 62b reflected from the printing object 4 may be detected by the photo detector 92 (S50). Through this, an output signal due to ultrasonic waves propagated through the printing object 4 can be measured.

It goes without saying that the quality of the printing object 4 may be inspected by analyzing the measured output signal (S60).

In an example embodiment, the 3D printing system 1 may detect a change in the propagation speed of ultrasonic waves generated in the printing object 4 using the pitch-catch technique to estimate physical properties of the printing object 4.

As described above, the propagation speed of ultrasonic waves in the printing object 4 is affected by the physical properties of the printing object 4. That is, referring to FIG. 12, the propagation speed of ultrasonic wave varies according to the physical properties of the printing object 4. Accordingly, the arrival times of the symmetric mode $S_0$ and the asymmetric mode $A_0$ of ultrasonic waves under the pitch-catch technique may be also changed.

In an example embodiment, the propagation speed of ultrasonic waves may be analyzed by measuring the arrival times of the ultrasonic waves in the symmetric mode $S_0$ and the asymmetric mode $A_0$. Through this analysis, physical properties such as elastic modulus, residual stress, etc. can be estimated. In estimating the physical properties, it goes without saying that correlation analysis using an artificial neural network model may be used, similar to the above-described physical property estimation.

In an example embodiment, when the pitch-catch technique is applied, a phase difference may occur in an output signal obtained through ultrasonic measurement due to a change in the propagation speed of the ultrasonic wave according to the physical properties. By analyzing the phase difference, the control unit 100 may detect a change in the propagation speed of the ultrasonic wave and finally estimate physical properties such as the elastic modulus and the residual stress. Even at this time, the control unit 100 may be configured to construct the aforementioned artificial neural network model in order to analyze the correlation between the physical properties and the phase difference.

Meanwhile, in an example embodiment, the 3D printing system 1 may detect a defect in the printing object 4 through the pitch-catch technique. For example, the control unit 100 may detect a defect in the printing object 4 by detecting nonlinearity of an output signal obtained through ultrasonic detection.

In more detail, referring to FIG. 13, when the printing object 4 which has a crack on its surface is excited by the ultrasonic waves of a low frequency $f_1$ and a high frequency $f_2$ simultaneously, nonlinear frequency modulation ($f_a$) may be generated at the sum frequency and difference frequency of the low frequency $f_1$ and the high frequency $f_2$.

In an example embodiment, the 3D printing system 1 may simultaneously excite the printing object 4 at the low-frequency $f_1$ and the high-frequency $f_2$ ultrasonic waves with the pump laser beam 62a or the printing laser beam 22, respectively and then detect the nonlinear modulation $f_a$ using the control unit 100, thereby early detecting defects such as surface crack of the printing object 4.

As described above, the present disclosure can perform the printing quality inspection including estimating physical properties and detecting defects in real time during the 3D printing process. This enables disposing of any defected product early in the printing process, thereby improving the efficiency of the 3D printing process. That is, since the 3D printing system can feedback control the 3D printing process in real time, product quality and the efficiency of the 3D printing system 1 can be improved.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A method of inspecting a printing quality of a 3D printing object, including:
    performing a 3D printing process by irradiating a printing laser beam generated by a 3D printing laser source onto a base material supplied to the printing object;
    generating a femtosecond laser beam by a femtosecond laser source to perform estimation of physical property of the printing object and detection of defects of the printing object in real-time while the 3D printing process is being performed;
    separating the femtosecond laser beam generated from the femtosecond laser source into a pump laser beam and a probe laser beam;
    generating an ultrasonic wave by exciting the printing object by the printing laser beam irradiated from the 3D printing laser source or by irradiating the separated pump laser beam onto the printing object;
    irradiating the probe laser beam onto a solidified region of the printing object to measure the ultrasonic wave;
    detecting the probe laser beam reflected by the printing object to be converted into an electric signal; and
    inspecting the printing quality of the printing object, including estimating a physical property of the printing object and detecting a defect of the printing object, by analyzing an amplitude and a phase of the converted electrical signal,
    wherein the printing laser beam, and the pump laser and the probe laser beam separated from the femtosecond laser beam are aligned coaxially with each other and applied to the printing object, and
    wherein the printing quality of the 3D printing object is inspected in real time using the femtosecond laser beam during the 3D printing process.

2. The method of claim 1, wherein in the generating the ultrasonic wave, the pump laser beam is irradiated onto the solidified region of the printing object spaced apart from the printing laser beam by a predetermined distance to generate ultrasonic wave.

3. The method of claim 2, wherein the probe laser beam and the pump laser beam are irradiated onto a same spot of the printing object.

4. The method of claim 1, wherein the printing laser beam, the pump laser beam, and the femtosecond laser beam are coaxially formed.

5. The method of claim 1, wherein the physical property of the printing object is estimated using a time difference between a first output signal caused by a surface reflected wave St of the printing object and a second output signal caused by a bottom reflected wave Sr of the printing object.

6. The method of claim 5, wherein the physical property includes at least one of a printing thickness and an elastic modulus of the printing object.

7. The method of claim 1, wherein the physical property of the printing object is estimated by detecting a change in a propagation speed of the ultrasonic wave generated in the printing object.

8. The method of claim 7, wherein the detecting of the change in the propagation speed of the ultrasonic wave generated in the printing object is performed by analyzing a phase difference of an output signal caused by the ultrasonic wave.

9. The method of claim 7, wherein the physical property estimated by detecting a change in the propagation speed of the ultrasonic wave includes an elastic modulus and/or a residual stress.

10. The method of claim 7, wherein detecting the change in the propagation speed of the ultrasonic wave generated in the printing object is performed by detecting a change in an arrival time of a symmetric mode and an asymmetric mode of the ultrasonic wave.

11. The method of claim 1, wherein the detecting of the defect of the printing object is performed by detecting at least one of a crack of the printing object and a void inside the printing object.

12. The method of claim 11, wherein the detecting of the defect of the printing object is performed by detecting an output signal caused by an additional reflected wave Sr' generated by at least one of a crack and a void in the printing object.

13. The method of claim 11, wherein the detecting of the defect of the printing object is performed by detecting nonlinearity of an output signal caused by the ultrasonic wave.

14. The method of claim 13, wherein the detecting of the nonlinearity of the output signal caused by the ultrasonic wave is performed by detecting a nonlinear modulation signal generated when the printing object is simultaneously excited by low-frequency and high-frequency ultrasonic waves.

15. The method of claim 13, wherein a defect detected based on the nonlinearity of the output signal caused by the ultrasonic wave is a surface crack of the printing object.

16. The method of claim 1, wherein the probe laser beam irradiated onto the solidified region is delayed in time compared to the pump laser beam through adjustment of an optical path length, and the pump laser beam irradiated onto the solidified region is a signal modulated at a predetermined frequency.

17. The method of claim 1, wherein in the generating of the ultrasonic wave, the pump laser beam is irradiated onto a same spot as the printing laser beam to generate the ultrasonic wave.

18. The method of claim 1, wherein in the generating of the ultrasonic wave, the printing laser beam is used as the pump laser beam to generate the ultrasonic wave.

19. The method of claim 1, wherein the separating of the femtosecond laser beam includes: separating the femtosecond laser beam into first and second femtosecond laser beams using the first beam splitter; modulating the separated first femtosecond laser beam into the pump laser beam; generating the probe laser beam by adjusting an optical path length of the separated second femtosecond laser beam; and adjusting an optical path of the pump laser beam so that the pump laser beam is coaxial with the probe laser beam and the printing laser beam.

* * * * *